Patented June 24, 1947

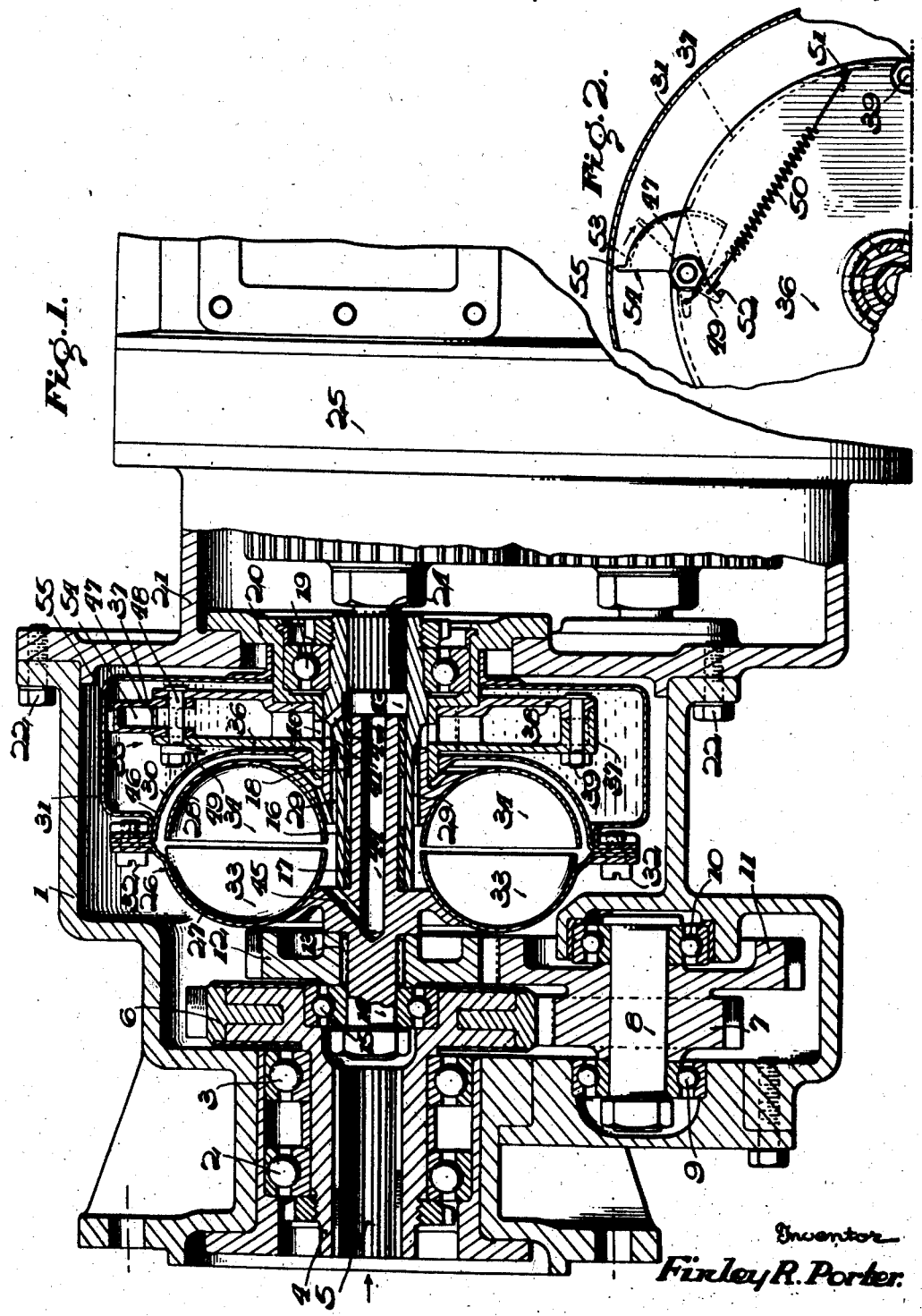

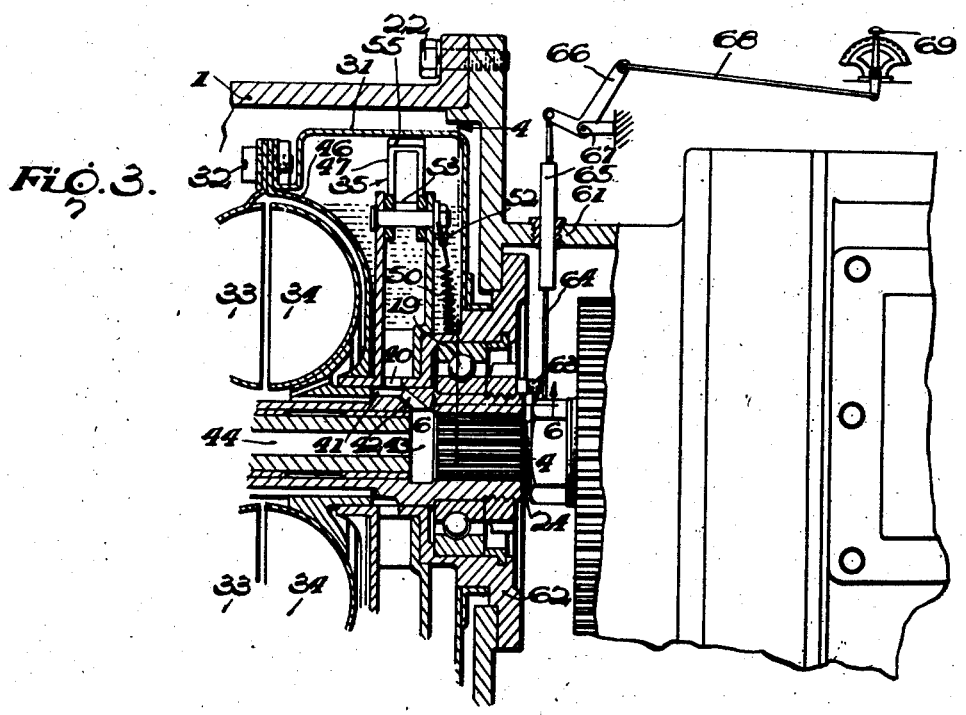
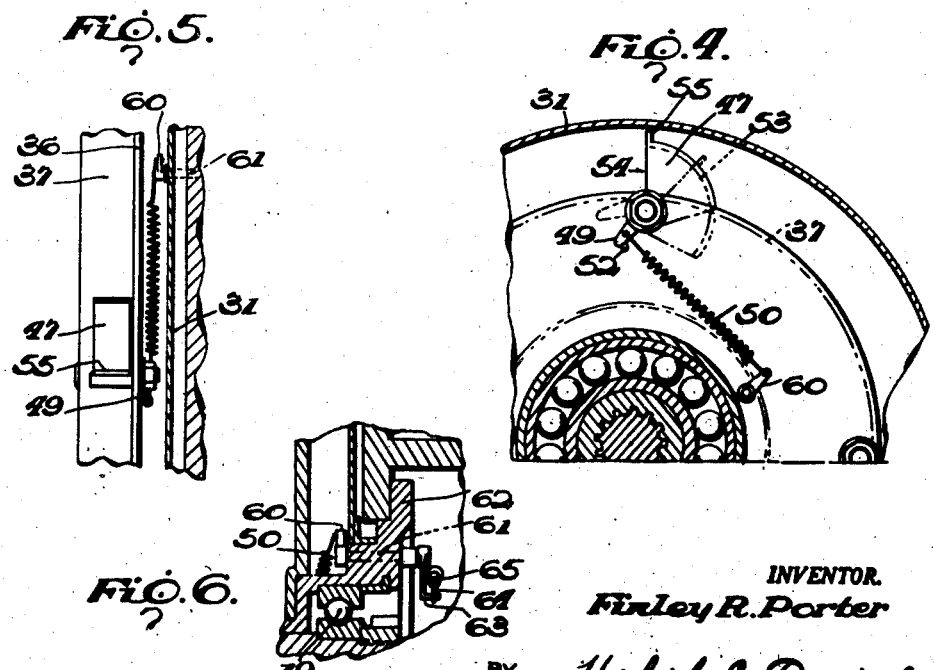

2,422,850

UNITED STATES PATENT OFFICE 2,422,850

HYDRAULIC COUPLING TYPE OF VARIABLE-SPEED TRANSMISSION

Finley R. Porter, South Hampton, N. Y., assignor to Bendix Aviation Corporation, Teterboro, N. J., a corporation of Delaware Application October 26, 1943, Serial No. 507,703

2 Claims. (Cl. 60—54)

This invention relates to improved means and methods for controlling speed differentials between driving and driven members, and has particular reference to a differential drive or transmission for a rotating body such as a blower, fan or supercharger impeller, or other accessory driven by an aircraft engine, wherein engine speeds vary according to flying requirements.

Accessories, however, such as superchargers, are, due to constructional and operating characteristics, limited for efficient operation to a lesser speed range than that provided by an aircraft engine, even beyond the two or more speed varying gear changes possible under the conventional structure.

An object of my invention, therefore, is to provide a novel differential drive having automatic means for changing the operating characteristics thereof to conform to varying operating requirements.

Another object of my invention is to provide a control responsive to driving shaft speed for maintaining at varying speeds of said driving shaft a more nearly constant torque and speed of the driven shaft.

Another object of my invention is to provide novel means for automatically maintaining a nearly constant driven shaft speed upon the driving shaft rotating at varying rates of speed above a predetermined minimum.

Another object of my invention is to provide a novel fluid coupling arrangement having means for automatically varying the slippage of the fluid coupling, as a function of driving shaft speed, to any predetermined ratio of driven shaft to driving shaft speed so as to maintain a substantially constant driven shaft speed and torque above a predetermined rate of speed.

A further object of my invention is to provide such a driven shaft speed control of great efficiency in comparison to its size, and of such simplicity in construction as to adapt it for manufacture and installation at low cost.

Another object of my invention is to provide novel means for varying the amount of coupling fluid in a fluid transmission for regulating the transmission ratio between driving and driven elements.

Other objects and advantages of this invention are set forth in the following description, taken with the accompanying drawings, and the novel features thereof are pointed out in the appended claims. The disclosure, however, is illustrative only and I may make changes in detail, especially in matters of shape, size and arrangement of parts within the principle of the invention to the full extent indicated by the broad and general meanings of the terms in which the appended claims are expressed.

In the accompanying drawings which form a part of this specification, like characters of reference indicate like parts in the several views, wherein:

Figure 1 is a sectional view of my novel constant speed fluid coupling drive.

Figure 2 is a fragmentary end view of the novel constant speed control scoop of Figure 1.

Figure 3 is a fragmentary sectional view of a modified form of my constant speed fluid coupling drive and showing means for varying the speed thereof.

Figure 4 is a sectional view of Figure 3 taken along the lines 4—4 and looking in the direction of the arrows.

Figure 5 is a fragmentary top view of the constant speed control scoop of Figure 3.

Figure 6 is a fragmentary sectional view taken along the lines 6—6 of Figure 3 and illustrating the adjustable control means.

Referring to the drawings in detail and particularly to Figure 1, the numeral 1 indicates a casing or housing within which is rotatably mounted on roller bearings 2 and 3 a driving member or shaft 4. The shaft 4 has provided therein internal splines 5 for connection to a driving shaft of a conventional aircraft engine not shown. The driving shaft 4 has formed integral therewith a gear 6, which is arranged to intermesh with a gear 7 rotatably mounted on a stud 8 carried by roller bearings 9 and 10. Formed integral with the gear 7 is a gear 11, which in turn intermeshes with a gear 12. The gear 12 is connected through splines 13 to a shaft 14, rotatably mounted at one end in roller bearings 15, concentrically positioned within the gear 6.

The opposite end of the shaft 14 is rotatably mounted in a sleeve 16 within bearing bushings 17 and 18. The sleeve 16 is rotatably mounted at an end opposite from shaft 14 in roller bearings 19 carried within a fixed sleeve 20. The sleeve 20 is mounted within the end of a casing 21, which is in turn affixed at the end of casing 1 by bolts 22.

The sleeve 16 has provided therein suitable internal splines for connecting the sleeve 16 to a shaft 24 for driving a blower, fan or supercharger indicated generally by the numeral 25 and which may be of any suitable type well known in the art.

A fluid coupling unit indicated generally by the numeral 26 is carried by the shaft 14 and sleeve 16, and has a casing portion 27 connected with the shaft 14, while another casing portion 28 is connected to the sleeve 16 through splines 29. The sleeve 16 as previously described is rotatably mounted on the shaft 14 by the bearing bushings 17 and 18.

Further spaced apart from the casing 28 are casing portions 30 and 31, which are fastened to the casing portion 27 by bolts 32.

In general, the elements 27 and 28, when associated in the relation illustrated, constitute a toroidal chamber, one-half of which is connected to the driving shaft 14 and the other half of which is drivingly associated with the driven sleeve 16 through the splines 29.

A plurality of radial vanes 33 are mounted in the casing 27, while a plurality of similar vanes 34 are mounted in the casing 28 for providing a fluid coupling between the casing 27 and casing 28 when a suitable coupling fluid medium is within the toroidal chamber. The coupling 26 may be of a general character well known to the prior art and commonly known as the Föttinger type of hydraulic coupling.

When the coupling fluid is not in the toroidal chamber, elements 27, 30 and 31 may rotate freely relative to the associate element 28, in which case there will be no drive between the shaft 14 and the sleeve 16. However, as the said coupling fluid is admitted to the toroidal chamber, the vanes 33 carried by the element 27 will exert a centrifugal force on the fluid causing the same to actuate the element 28 through the vanes 34 carried thereby.

The speed of rotation of the driven element 28 will depend upon the slippage between the driving and driven elements 27 and 28, and the speed of rotation of the driving element 27. Obviously the speed of rotation of the driven element may be kept at a relatively constant rate by varying the slippage in direct relation to the speed of rotation of the driving member, so that the greater the speed the greater the slippage between the driving and driven elements. Thus, the greater the speed of rotation of the driving member the greater the difference in speeds between the two elements, and conversely the slower the speed of rotation of the driving member the less the difference in speeds between the driving and driven elements.

In order to accomplish this result, I have provided a novel means responsive to the speed of the driving member for controlling the supply of the coupling fluid medium delivered to the toroidal chamber.

Thus as shown in Figure 1, the casing 31 provides a tank or sump for storing the fluid coupling medium, which is separated from the toroidal chamber by the casing wall 30.

The tank or sump 31 is rotated with the casing wall 27 by the driving shaft 14 so that the fluid carried by the sump 31 is thrown by centrifugal force to the outer rim of the sump 31.

For controlling the supply of fluid furnished the coupling 26 there is provided a fluid receptacle 35 fixedly mounted in relation to the revolving fluid sump 31. The receptacle 35 includes an annular plate 36 formed integral with the fixed sleeve 20. The plate 36 has a flange 37 which projects at a right angle thereto and extends circumferentially around the same.

A second annular plate 38 is positioned in spaced relation to the annular plate 36 and fastened thereto by bolts 39 in sealing relation with the annular flange 37. It will be thus seen that there is provided by the plates 36 and 38 a receptacle or chamber stationarily mounted in relation to the revolving sump 31. As will be explained, the receptacle 35 is arranged to carry a fluid medium for supplying the coupling 26.

The receptacle 35 has provided a duct 40, which opens into an annular channel 41 surrounding the sleeve 16. A second duct 42 formed in the sleeve 16 opens at one end into the annular channel 41 and at the opposite end into an interior chamber 43 formed within the sleeve 16. The chamber 43 is connected by a drilled passage 44 provided in shaft 14 to a duct 45 leading into the toroidal chamber. Thus it will be seen that the fluid medium may be conducted from the receptacle 35 to the coupling 26.

A port 46 of suitable size is provided in the casing 30 so the fluid medium within the toroidal chamber may be returned under centrifugal force to the fluid sump 31. The return discharge through the port 46 increases as the centrifugal force increases, for a purpose which will be explained.

A novel inlet in the form of an automatic valve or scoop 47 is provided for controlling the passage of fluid from the sump 31 into the receptacle 35. The scoop 47 is positioned in an opening formed in the flange 37 at one side of the receptacle 35, between the annular plates 36 and 38. The scoop 47 is affixed to a bolt 48 pivotally mounted in the said plates 36 and 38 and extending transversely of the same as best shown in Figure 1. Affixed to the bolt 48 is an arm 49 positioned exteriorly of the receptacle 35. A tension spring 50 is connected at one end to the arm 49 and fastened at the opposite end to a suitable fastening member 51 provided on the plate 36. The spring 50 is arranged in such a manner as to bias the scoop 47 in a counterclockwise direction. A stop pin 52 limits the movement of the scoop 47 in response to the biasing effect of the spring 50 at the extreme vertical or maximum open position, as shown in Figure 2.

The scoop 47 has provided an arcuate walled portion 53 and an opening at 54. Positioned immediately above the opening 54 is an outwardly projecting flanged portion 55 which serves as a deflector. Thus upon rotation of the sump 31 in a clockwise direction in relation to the receptacle 35, as viewed in Figure 2, the fluid medium contained therein is thrown by centrifugal force to the outer rim of the sump 31 so as to enter the scoop 47 at the opening 54. The fluid medium in the revolving sump 31 further exerts a force upon the deflector 55 tending to bias the scoop 47 in a clockwise direction in opposition to the tension of the spring 50. Such clockwise movement of the scoop 47, as shown in dotted lines in Figure 2, will decrease the angle that the opening 54 makes with the fluid medium, and thereby decrease the effectiveness of the scoop 47.

In the operation of my invention, the casing 27 and fluid sump 31 are driven by the aircraft engine through the shaft 4, gears 6, 7, 11, 12 and shaft 14 in a clockwise direction, as viewed in Figure 2, so that the fluid medium contained in the sump 31 will be thrown to the outer rim thereof.

When the speed of the aircraft engine is not in excess of a predetermined value such fluid medium will be fed into the receptacle 35 through the opening 54 in the scoop 47, which will be held in a full open position under the biasing force of the spring 50. Moreover as the speed of the aircraft engine increases within the predetermined value, the supply of fluid medium entering the opening 54 and passing into the receptacle 35 will increase with the speed of rotation of the driving member 4.

Further the rotation of the member 27 will cause through centrifugal force a suction force to be applied to the receptacle 35 through the duct 40, channel 41, duct 42, chamber 43, passage 44 and duct 45, which will draw through said passages a fluid medium from the receptacle 35 into the fluid coupling 26.

As the fluid medium passes into the fluid coupling 26 the vanes 33 carried by the element 27 will exert a centrifugal force on the fluid medium causing the same to actuate the element 28 through the vanes 34 carried thereby.

Since the element 28 is connected by the splines 29 to the sleeve 16, rotation of the element 28 will in turn cause rotation of the driven member 25. Moreover the fluid medium within the fluid coupling 26 will in turn be discharged under centrifugal force through the port 46 and returned to the fluid sump 31.

As the speed of rotation of the aircraft engine increases, the speed of rotation of the driven member 25 will be increased until the predetermined value is reached. A further increase in the speed of the driving mmber will then cause the fluid medium within the sump 31, under centrifugal force, to act upon the deflector 55 in such a manner as to bias the scoop 47 in a clockwise direction, as viewed in Figure 2, in an amount dependent upon the speed of rotation of the driving member. Such movement of the scoop 47 will thereby reduce the depth of contact of the scoop 47 in the fluid medium carried by the outer wall of the sump 31, and likewise decrease the amount of fluid medium supplied to the receptacle 35 and the fluid coupling 26. Further the discharge of fluid medium from the coupling 26 through the port 46 increases, as the centrifugal force rises, on an increase in the rate of rotation of the sump 31. Such action causes a decrease in the amount of fluid medium within the hydraulic coupling 26, thereby increasing the slippage between the driving member 27 and the driven member 28, so as to increase the difference between the rates of rotation of the two members. When the said driving shaft speed decreases, the opposite cycle of forces act to increase the fluid content of coupling 26 and reestablish the slip ratio between driving and driven members.

The mechanism is so arranged that upon the driving element rotating at a rate of speed in excess of a predetermined value, the rotation of the driven element will be kept at a relatively constant rate by varying the slippage between the driving and driven elements, as described, in direct relation to the speed of rotation of the driving member.

In the second form of my invention illustrated in Figures 3, 4, 5 and 6 I have shown a modified form of my invention embodying novel means for varying the aforementioned predetermined value of the rate of rotation of the driving member.

This is specifically accomplished by providing means for varying the biasing force exerted by the spring 50 on the scoop 47. Thus rather than connecting the spring 50 to a fixed member 51 as in the first form of my invention, I have shown in Figures 3, 4, 5 and 6 the same connected to an adjustable arm 60 affixed at the inner end of a shaft 61. The shaft 61 projects through a fixed sleeve 62, which corresponds to the sleeve 20 previously described in reference to Figure 1. Affixed at the outer end of the shaft 61 is a second arm 63, which is connected to a suitable adjustment means such as a wire 64 slidably mounted in a cable 65. The wire 64 is connected at the opposite end to a bell crank lever 66 pivotally mounted at 67 and controlled through a rod 68 connected to a manually operable control lever 69, which may be conveniently mounted within the cabin of the plane. The control lever 69 is so arranged that upon moving the same in a counterclockwise direction the lever 60, as viewed in Figure 4, will be moved in a clockwise direction increasing the tension of the spring 50, while upon moving the control lever 69 in a clockwise direction the tension of the spring 50 will be decreased.

Suitable means may be provided for locking the control lever 69 in any desired adjusted position.

From the foregoing it will be readily seen that upon increasing the tension of the spring 50, a greater biasing force must necessarily be set up by the fluid medium within the sump 31, which is arranged to revolve in a clockwise direction, as viewed in Figure 4, before the scoop 47 may be biased so as to decrease the effective position thereof. Thus, a greater predetermined rate of rotation must be effected before the constant speed maintaining mechanism will be brought into operation. Similarly by decreasing the tension of the spring 50 a lower predetermined rate of rotation of the driving member would be required for causing the operation of the constant speed maintaining mechanism. Likewise by varying the tension of the spring 50 the maximum rate of rotation of the driven unit may be varied as desired.

From the foregoing, it will be readily seen that I have provided novel means for maintaining a driven member at a predetermined constant rate of speed, upon the driving member maintaining a rate of speed in excess of a predetermined value. Further, I have provided novel adjustable means for determining the said predetermined values.

Although only two embodiments of the invention have been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In hydraulic transmission apparatus adapted for operation between an aircraft engine and an engine accessory, the combination of a housing adapted at one end for mounting on the engine and at the other end for attachment to the accessory, a first driving shaft at said one end adapted for attachment to a rotative engine element, a second driving shaft, a gear train connected between said shafts for increasing the speed of said second shaft relative to the speed of the engine element, a driven shaft telescopically related to said second shaft rotatable relative thereto and adapted for attachment to a shaft of the accessory, a fluid coupling including a first coupling member fixed to said second shaft and a second coupling member fixed to said driven shaft, means fixed to said first coupling member forming therewith the coupling fluid chamber enclosing said second coupling member and also forming a sump outside said chamber having fluid communication therewith, a stationary hollow disc-like receptacle within said sump and having a radially inner support at said other housing end, said receptacle communicating at its radially inner portion through ducts in said driven shaft and said second driving shaft with said coupling chamber and having a peripheral opening, a hollow scoop of substantially sector-shape pivotally mounted locally adjacent to the periphery of said receptacle for movement in said opening, said scoop facing the direction of rotation of said sump and having a deflector vane operated by the fluid in the sump for varying the position of the scoop and the rate of fluid intake thereof to the receptacle in accordance with the rate of rotation of the sump, and spring means connected between said scoop and said receptacle for biasing the scoop about its pivot oppositely to the direction of rotation of the sump.

2. In hydraulic transmission apparatus adapted for operation between an aircraft engine and an engine accessory, the combination of a housing adapted at one end for mounting on the engine and at the other end for attachment to the accessory, a first driving shaft at said one end adapted for attachment to a rotative engine element, a second driving shaft, a gear train connected between said shafts for increasing the speed of said second shaft relative to the speed of the engine element, a driven shaft telescopically related to said second shaft rotatable relative thereto and adapted for attachment to a shaft of the accessory, a fluid coupling including a first coupling member fixed to said second shaft and a second coupling member fixed to said driven shaft, means fixed to said first coupling member forming therewith the coupling fluid chamber enclosing said second coupling member and also forming a sump outside said chamber having fluid communication therewith, a stationary hollow disc-like receptacle within said sump and having a radially inner support at said other housing end, said receptacle communicating at its radially inner portion through ducts in said driven shaft and said second driving shaft with said coupling chamber and having a peripheral opening, a hollow scoop of substantially sector-shape pivotally mounted locally adjacent to the periphery of said receptacle for movement in said opening, said scoop facing the direction of rotation of said sump and having a deflector vane operated by the fluid in the sump for varying the position of the scoop and the rate of fluid intake thereof to the receptacle in accordance with the rate of rotation of the sump, a pivot pin extending through said receptacle support between the interior and exterior of said housing at said other end, means including spring means connected between said scoop and the inner end of said pin for biasing the scoop about its pivot oppositely to the direction of rotation of the sump, and means outside said housing operating through said pin for varying the tension of said spring.

FINLEY R. PORTER.

REFERENCES CITED

The following references are of record in the file of this patent:

UNITED STATES PATENTS

| Number | Name | Date |
|---|---|---|
| 1,881,082 | Fiep | Oct. 4, 1932 |
| 2,187,667 | Sinclair | Jan. 16, 1940 |
| 2,289,440 | Kugel | July 14, 1942 |
| 1,855,032 | Sinclair | Apr. 19, 1932 |
| 2,317,938 | Putt | Aug. 27, 1943 |
| 2,212,774 | Guyer | Aug. 27, 1940 |
| 2,049,673 | Starr | Aug. 4, 1936 |

FOREIGN PATENTS

| Number | Country | Date |
|---|---|---|
| 405,288 | Great Britain | 1934 |